Patented Jan. 4, 1938

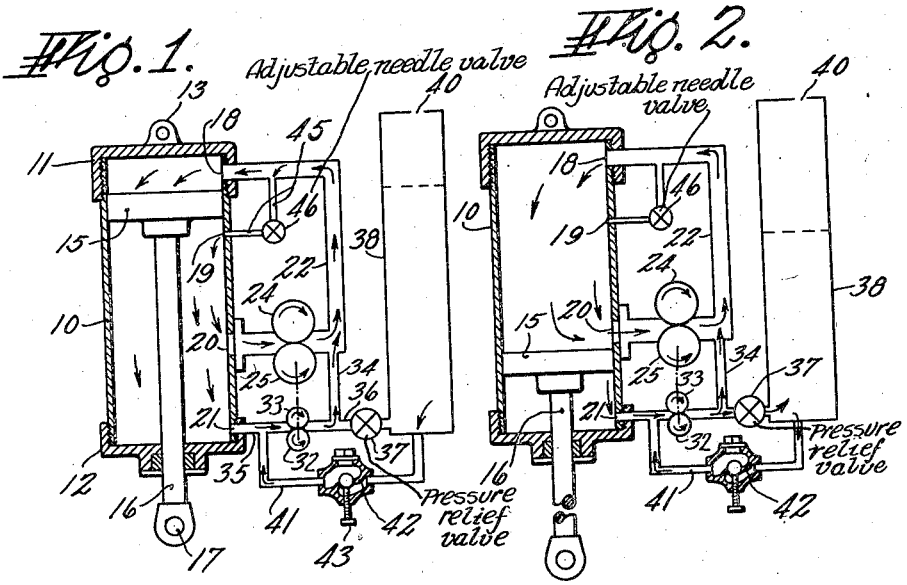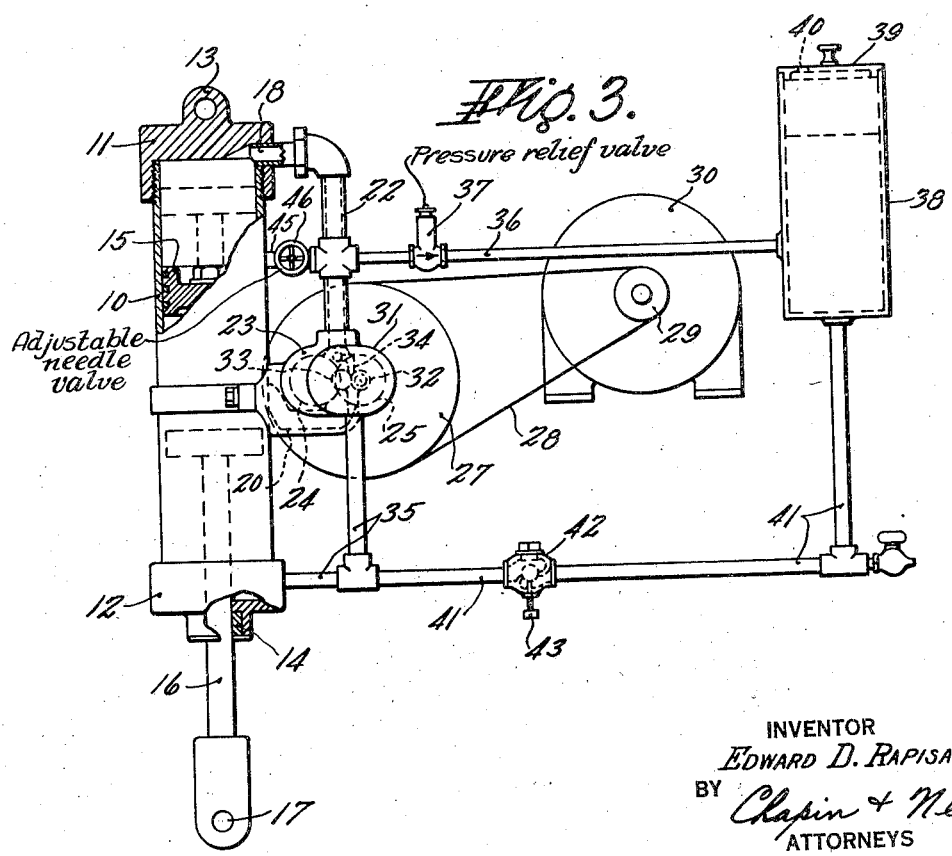

2,104,308

UNITED STATES PATENT OFFICE 2,104,308

PRESS MECHANISM

Edward D. Rapisarda, Agawam, Mass., assignor of one-half to George E. Byford, Winchester, Mass.

Application March 9, 1935, Serial No. 10,344

11 Claims. (Cl. 60—52)

This invention relates to a pressure producing device such for example as is used on presses, and has particular utility in connection with such presses as are used in laundries where a rapid closing is desired with a final slow application of relatively heavy pressure. One object of the invention is to reduce the power consumption and cost of equipment necessary for a given pressure and speed of operation. Another object is to make a self-contained unit avoiding the necessity for external fluid compressors and piping, and which will have distinct advantages over forms of self-contained power units previously proposed. Another object is to provide a mechanism capable of operation by positive liquid pumps. Additional objects will appear from the following description and claims.

Referring to the drawing,

Figs. 1 and 2 are diagrammatic views showing the operation of the pressure device; and Fig. 3 is a view illustrating some of the mechanical features thereof.

The power producing mechanism is of the cylinder and piston type, the cylinder 10 having heads 11 and 12 of which the former has an attachment lug 13 and the latter a stuffing box 14. Traveling in the cylinder is a piston 15, the rod 16 of which extends through the stuffing box 14 and is provided with a coupling lug 17. In the wall of the cylinder are provided ports 18, 19, 20 and 21, the first and last being positioned adjacent the ends of the cylinder and the others at an intermediate point.

The ports 18 and 20 are connected by a pipe 22 in which is interposed a housing 23 secured to the cylinder 10 and serving to enclose a gear pump having gears 24 and 25. A shaft on the gear 25 is coupled to a pulley 27 joined by a belt 28 to a pulley 29 on the shaft of a reversible motor 30. It will be obvious as the description proceeds that other forms of motive power or of positively acting liquid pumps may be substituted if desired. Formed preferably as a part of housing 23 is a second housing 31 enclosing gears 32 and 33 which form a second gear pump of considerably smaller size than the gear pump 24, 25. The gear 32 is preferably mounted on the same shaft as gear 25, the gears 24 and 33 being idlers, so that only one shaft need enter the composite housing 23, 31. By thus minimizing the number of stuffing boxes necessary the danger of leakage and the power consumed in friction are both reduced.

The two gear pumps are connected by a duct 34 on their sides remote from the cylinder, and the smaller gear pump is connected to port 21 by a pipe 35. A pipe 36, in which is interposed a pressure regulating check valve 37, leads from the conduit 22, 34 to a tank 38 partially filled at all times with oil or other liquid. A cover 39 for this tank is provided with a vent 40 so that the rise and fall of the liquid within the tank will not be interfered with by the air above it. A pipe 41 joins the pipe 35 with the bottom of the reservoir, and has in it a check valve 42 preferably provided with an adjustment 43 by which it may be held slightly open. Finally, a pipe 45 connects the pipe 22 with the port 19, and has a needle valve 46 in it so that the flow may be regulated.

With the described parts in mind the operation of the mechanism may be considered. Taking the parts first in the position of Fig. 1, and assuming that the gear pumps are driven in the direction of the arrows, it will be clear that the initial circulation of the oil will be in the direction of the arrows. (It must be borne in mind that a gear pump delivers liquid in opposition to the motion of the contact line of the gears). The general motion of the oil is into the cylinder through ports 18 and 19 and out of it through ports 20 and 21. It will be noted that the effect of the two pumps is additive at this time. The flow of liquid above the piston can only be satisfied by a downward travel of the piston, this occurring at a rapid rate on account of the comparatively large capacity of pump 24, 25.

When the piston reaches the port 20 the flow from the cylinder to the pump 24, 25 is cut off, and the piston will be forced downwardly solely by the flow through the pump 32, 33. The piston will remain in this port blocking position only momentarily, and as soon as the port 20 is uncovered by the upper side of the piston the larger pump will simply circulate the oil around through ports 18 and 20 as shown in Fig. 2 without doing any work on the piston, and with very little power consumed in it since the pressure on the intake and output sides of the pump are substantially equalized. Here again the piston is moved solely through the action of the smaller pump, and its travel will be at a relatively slow rate. At about this time the press has closed, and continued action of the pumps will maintain a heavy pressure on it.

Once the piston has stopped, no flow out of the cylinder can occur, (unless oil leakage occurs past the piston or air leakage occurs through the stuffing box) and it is desirable to provide some way for the oil to circulate in order to prevent the sucking of air past the piston rod. For this purpose the pipe 41 and the check valve 42 are provided, giving a chance for oil to come from the reservoir 38 to the suction side of the pump 32, 33. From the delivery side of this pump oil passes through valve 37 to the reservoir. This valve permits flow towards the reservoir only, and is provided with a spring tension, as is customary in commercial valves of this type, so that the pump always acts against a regulable pressure. A pressure in the line 22, 34, and therefore in the space above the piston is thus always maintained.

On the return stroke a reverse action occurs. The press will open at first slowly under the action of the pump 32, 33, which is driven by the motor 30 in the reverse direction. When the piston passes the port 20 both pumps come into action, and the movement of the piston is more rapid until the end of the stroke when the motor is stopped. During the ascent of the piston the rod 16 displaces more and more of the oil in the cylinder, and this is gradually forced back through the valves 37 and 42 into the tank 38. The oil in this tank is always under atmospheric pressure, and serves merely as a reserve to keep the main system full at all times.

The needle valve 46 which connects the ports 18 and 19 is a preferable refinement, and has a double function. During the initial part of the downward stroke of the piston it is desirable to avoid too great a shock on the system as the motor starts, and the by-pass valve permits a determinable quantity of oil to pass around the piston until the latter has moved beyond the port 19. After this time the port 19 adds its effect to that of port 18. In the reverse or press opening stroke the motor 30 is preferably stopped before the piston reaches the upper end of its stroke, allowing the remainder of the travel to be accomplished under the influence of the normal overbalancing of the press or of the usual counterbalancing springs. In this action the valve 46 will give the oil a chance to by-pass the piston without passing through the then stationary pumps, and allows the mechanism to act as a controllable dash pot serving to bring the press slowly and easily to rest in its open position.

I claim:

1. In a pressure producing device, cylinder and piston mechanism, the cylinder having a port adjacent each end and a port at an intermediate position, located so as to be uncovered by the piston during its travel, a positive acting liquid pump connected between one end port and the intermediate port, and a second positive acting liquid pump connected between the two end ports.

2. In a pressure producing device, cylinder and piston mechanism, the cylinder having a port adjacent each end and a port at an intermediate position, located so as to be uncovered by the piston during its travel, a positive acting liquid pump connected between one end port and the intermediate port, a second positive acting liquid pump connected between the two end ports, and a reversible power means operating said pumps.

3. In a pressure producing device, a cylinder and piston mechanism, a pressure producing liquid pump, connections between said pump and the cylinder to cause the pump to circulate liquid between the two ends of the cylinder, a second pressure producing liquid pump, connections between said second pump and the cylinder to cause the second pump to circulate liquid between one end of the cylinder and an intermediate point thereof which is passed by the piston during its travel, and means for driving the pumps to cause their action to be additive during the travel of the piston up to said intermediate point and the first pump alone to be active during the remainder of the travel of the piston, the second pump after the passage of the piston past said intermediate point circulating liquid through the cylinder between one end and said intermediate point without causing pressure to be exerted upon the piston.

4. In a pressure producing device, cylinder and piston mechanism, a pressure producing liquid pump, connections between said pump and the cylinder to cause the pump to circulate liquid between the two ends of the cylinder, a second pressure producing liquid pump, connections between said second pump and the cylinder to cause the second pump to circulate liquid between one end of the cylinder and an intermediate point thereof which is passed by the piston during its travel, means for driving the pumps to cause their action to be additive during the travel of the piston up to said intermediate point and the first pump alone to be active during the remainder of the travel of the piston, the second pump after the passage of the piston past said intermediate point circulating liquid through the cylinder between one end and said intermediate point without causing pressure to be exerted upon the piston, a liquid reservoir, a connection between the reservoir and the second end of the cylinder, and a pressure relief valve connecting the pressure side of the first pump with the reservoir.

5. In a pressure producing device, cylinder and piston mechanism, the cylinder having a port adjacent each end and a port at an intermediate portion, a positive acting liquid pump connected between one end port and the intermediate port, a second positive acting liquid pump connected between the two end ports, a liquid reservoir, a connection between the output of the second pump and the reservoir, a one-way pressure regulating valve in said connection permitting flow into the reservoir, a connection between the reservoir and the input of the second pump, and a one-way valve in said last-named connection permitting flow from the reservoir to the pump.

6. In a pressure producing device, cylinder and piston mechanism, the cylinder having a port adjacent each end and a port at an intermediate portion, a positive acting liquid pump connected between one end portion and the intermediate port, a second positive acting liquid pump connected between the two end ports, a liquid reservoir, a connection between the output of the second pump and the reservoir, a one-way pressure regulating valve in said connection permitting flow into the reservoir, a connection between the reservoir and the input of the second pump, a one-way valve in said last-named connection permitting flow from the reservoir to the pump, and a regulable by-pass around the piston when the latter is adjacent the end of the cylinder common to the two pumps.

7. In a pressure producing device, cylinder and piston mechanism, the cylinder having a port adjacent each end and a port at an intermediate portion, a positive acting liquid pump connected between one end portion and the intermediate port so that after the piston passes the intermediate port, the pump merely circulates the liquid above the piston into the cylinder out of the end port and out of the cylinder through the intermediate port without exerting substantial additional pressure, a smaller positive acting liquid pump connected between the two end ports, a liquid reservoir, and pressure relief valve mechanism connecting the smaller pump to the reservoir.

8. In a pressure producing device, cylinder and piston mechanism, the cylinder having a port adjacent each end and a port at an intermediate portion, a pump housing, a pair of gear pumps located in the housing, said pumps being of different sizes and having a single operating shaft projecting from the housing, and connections between the larger of said pumps, one end port, and the intermediate port so that after the piston passes the intermediate port, the larger pump merely circulates the liquid above the piston into the cylinder out of the end port and out of the cylinder through the intermediate port without exerting substantial additional pressure and connections between the smaller of the pumps and the two end ports.

9. In a pressure producing device, cylinder and piston mechanism, a pair of pumps connected to the cylinder for additive operation during at least a portion of the motion of the mechanism towards maximum piston stroke, means automatically operable towards the end of said motion to terminate the effective action of one only of the pumps and additional means automatically operable to thereafter establish and maintain a constant, positive pressure on the piston at whatever position the piston is arrested by resistance.

10. In a pressure producing device, cylinder and piston mechanism, a pair of pumps connected to the cylinder, means for operating both pumps continuously during the motion of the mechanism towards maximum piston stroke, the direction of the operation of the pumps being such that they are additive in their effect on the piston during such motion, means automatically operable towards the end of said motion to terminate the effective action of one only of the pumps without interrupting its continued motion, and additional means automatically operable to thereafter establish and maintain a constant, positive pressure on the piston at whatever position the piston is arrested by resistance.

11. In a pressure producing device, cylinder and piston mechanism, a pair of pumps connected to the cylinder, means for operating both pumps continuously during the motion of the mechanism towards maximum piston stroke, the direction of the operation of the pumps being such that they are additive in effect on the piston during such motion, means automatically operable towards the end of said motion to short circuit the flow of fluid between one only of the pumps and the cylinder to terminate its effective action without interrupting its continued motion and additional means automatically operable to thereafter establish and maintain a constant, positive pressure on the piston at whatever position the piston is arrested by resistance.

EDWARD D. RAPISARDA.